United States Patent [19]

Holyoak

[11] 4,429,659

[45] Feb. 7, 1984

[54] APPARATUS AND METHOD OF CONFINING FISH

[76] Inventor: Hugh K. Holyoak, Rte. 1, Alapaha, Ga.

[21] Appl. No.: 252,934

[22] Filed: Apr. 10, 1981

[51] Int. Cl.³ ............................................. A01K 63/00
[52] U.S. Cl. ........................................ 119/3; 43/103
[58] Field of Search ...................... 119/3; 43/100, 103, 43/104, 55, 7, 1

[56] References Cited

U.S. PATENT DOCUMENTS

| | | | |
|---|---|---|---|
| 1,761,365 | 6/1930 | Reed | 43/102 |
| 2,441,015 | 5/1948 | Fisher | 43/104 |
| 2,908,105 | 10/1959 | Rogers | 43/55 |
| 3,048,937 | 8/1962 | Hustad | 43/55 |
| 3,717,124 | 2/1973 | Jacobs | 119/3 |
| 4,019,459 | 4/1977 | Neff | 119/3 |
| 4,170,196 | 10/1979 | Yoneya | 119/3 |

FOREIGN PATENT DOCUMENTS

| | | | |
|---|---|---|---|
| 75795 | 5/1953 | Denmark | 43/100 |
| 2016135 | 10/1971 | Fed. Rep. of Germany | 119/3 |

Primary Examiner—Hugh R. Chamblee
Attorney, Agent, or Firm—Newton, Hopkins & Ormsby

[57] ABSTRACT

In one embodiment of the fish cage, a plurality of hollow plastic tubular members form an open lattice, buoyant, frame which normally floats in water. A net assembly is carried in the interior of the frame and a removable net top is secured by spring hooks over the open upper portion of the frame. One end of the net assembly is provided with an inwardly converging, funnel-like fish inlet and the other end of the net assembly, with an outwardly converging, funnel-like fish outlet. Thus, fish have free access to bait in the net assembly by swimming through the fish inlet and can freely depart through the fish outlet, except when the outlet is folded to a closed condition. Tie wraps hold the net assembly to the frame. In the other embodiment the frame is rectangular and the net assembly hangs pendant therefrom. Each fish cage has a demand feeder. A plurality of the cages are secured in tandem on a continuous conveyor for moving the cages successively through a treatment lock and a food replenishing zone.

24 Claims, 20 Drawing Figures

APPARATUS AND METHOD OF CONFINING FISH

BACKGROUND OF THE INVENTION

1. Field of the Invention

This invention relates to an apparatus for confining and feeding fish and is more particularly concerned with a method and apparatus for feeding and trapping or caging fish.

2. Description of the Prior Art

In the past, numerous cages have been made for catching fish and other sea creatures, such cages usually consisting of a frame and a mesh extending around the frame. At one or a plurality of ends of the prior art cage, funnel-like entrances are provided so that the fish, crabs, lobsters, and the like will enter the cage through the funneled entrance in order to have access to feed within the cage and then be unable to escape from the cage, due to the fact that they cannot find the opening in the tapered entrance through which they entered the cage.

Plastic nets have heretofore been used and various methods have been used for joining the mesh material together where appropriate to fit the frame.

BRIEF DESCRIPTION OF THE INVENTION

Briefly described, the present invention includes a plurality of cages, each having a frame which is formed of a plurality of hollow tubular plastic struts and connectors joined to produce an open lattice, right cubic frame in which the tubular struts are air tight. The tubular struts, therefore, form a buoyant frame which normally floats and will buoy up the complete cage. A plastic net assembly having a net body with opposed side walls, opposed end walls and the bottom wall is carried by the frame. A removable rectangular top net is secured by spring hooks over the open upper or top side of the net body. In one embodiment the cage has a demand feeder which is refillable without disturbing the cage.

One end wall of the net body is provided with an inwardly converging, funnel-shaped fish inlet or entrance member and the other end wall of the body is provided with a funnel-shaped, outwardly converging fish outlet or exit member. The fish can, therefore, have free access to the bait in the interior of the cage by swimming through the small hole at the apex of the conical inlet member. In like fashion, the fish can exit the cage by swimming out through the small hole at the outer end of the converging conical outlet member. Thus, the fish become trained to feed on the bait in the cage and then swim out of the cage. When, however, the exit of the outlet member is closed, the fish are trapped in the cage.

The lightweight structure of the frame enables the cage to float with its top awash on the surface or be anchored at a position below the surface. If water is admitted to the interior of the frame, the cage has negative buoyance and sinks to the bottom. Furthermore, weights or anchors can retain the cage on the bottom, if desired.

In one embodiment, a plurality of the traps are successively disposed in spaced relationship to each other along a motor driven cable conveyor, suspended over a pond or confined body of water. The conveyor passes the cages successively through a lock assembly where each cage can be selectively lifted from the water, treated with chemicals, aerated, and stocked with food.

In another embodiment is a fish cage having the frame formed of hollow tubular struts joined by elbows into an open rectangular or square float. A pendant net body is suspended by its top portion from the frame. A rectangular top extends over the frame and pendant net body.

Accordingly, it is the object of the present invention to provide an apparatus for confining, feeding and treating fish which is inexpensive to manufacture, durable in structure and efficient in operation.

Another object of the present invention is to provide an apparatus for confining fish which can be shipped in a disassembled condition.

Another object of the present invention is to provide a fish cage which is capable of being selectively operated as a feeder for fish and as a cage for the fish.

Another object of the present invention is to provide a fish confining device which will float with its top awash and all but the top portion thereof in a submerged condition or sink to the bottom, as desired.

Another object of the present invention is to provide a fish confining member which will not deteriorate appreciably in the water.

Another object of the present invention is to provide an apparatus and process by which fish, and other sea creatures may be readily and easily selectively confined and released or fed and treated without physically handling them.

Another object of the present invention is to provide an apparatus and process by which fish and other sea creatures will be trained for easy ultimate capture in a cage.

Other objects, features and advantages of the present invention will become apparent from the following description when taken in conjunction with the accompanying drawing wherein like characters of reference designate corresponding parts throughout the several views.

DESCRIPTION OF THE PREFERRED EMBODIMENTS

Referring now in detail to the embodiments chosen for the purpose of illustrating the present invention, numeral 10 denotes generally the main frame of the fish cage depicted in FIGS. 1 through 14. This main frame 10 includes four spaced parallel longitudinal struts each of which is formed of successive, aligned, cylindrical, tubular, extruded plastic, pipe struts 11a, 11b, and 11c which are aligned coaxially in tandem, being joined at their adjacent ends by fittings, namely four-way tees or connectors 12a and 12b, the tees 12a joining the ends of struts 11a to the ends of struts 11b and the tees 12b joining the other ends of struts 11b to the ends of struts 11c.

Extending between laterally opposed tee connectors 12a are parallel transversely extending, horizontal, crossbars or struts 13a. A similar pair of parallel transversely extending, horizontal crossbars 13b extend between opposed pairs of the tee connectors 12b, the crossbars 13b being longitudinally spaced from but parallel to crossbars 13a.

Two opposed, upright, parallel, central struts 14a extend between the upper and lower tee connectors 12a and two similar struts 14b connect between the tee connectors 12b.

Connected to the outer ends of the four struts 11a are a like number of 90° elbow or fittings 15b. A pair of opposed upright end struts 16a connect the opposed ends of the elbow fittings 15a together. Each elbow fitting 15a is provided with a side port 15b, from which protrudes a stub pipe 15c.

Parallel upper and lower, transversely extending, end struts 16b extend between opposed, vertically aligned pairs of stub pipes 15c, the ends of the struts 16b being provided with sleeves 17 which join the abutting end of the pipe 15c to the end of the strut 16b.

In like fashion, the other end of the frame includes the 90° elbows or fittings 18a which are identical to the elbows 15a, these elbows 18a having ports 18b and stub pipes 18c which are all identical to the ports 15b and the stub pipes 15c. The vertical struts 19a extend between the elbows 18a and upper and lower struts 16b join stub shafts 18c. Sleeves 19, which are identical to sleeves 17, form unions between the stub shafts 18c and the ends of the struts 19b.

Figure 2:
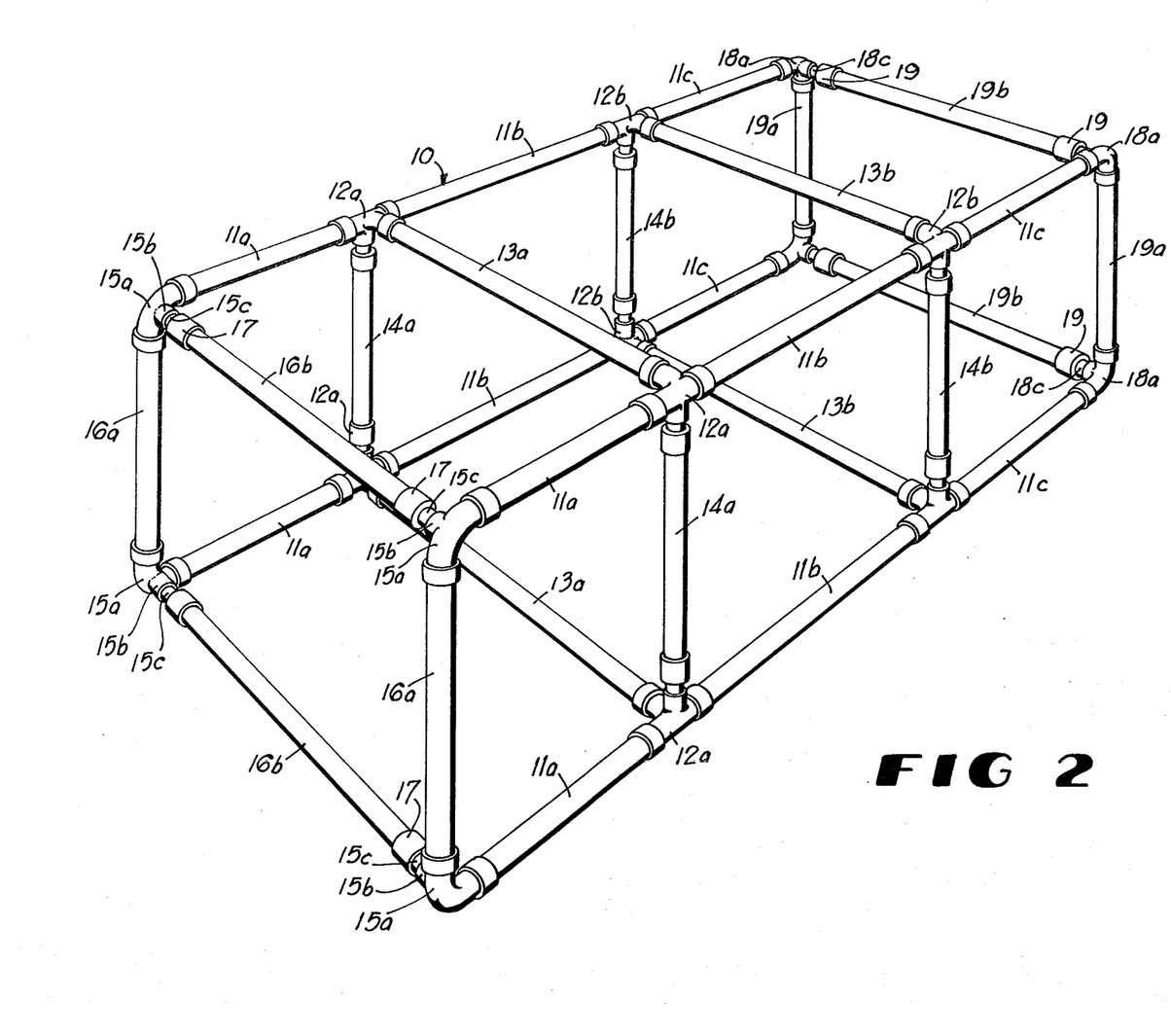
FIG. 2 is a perspective view of the frame of the fish cage depicted in FIG. 1.

It will be understood that the various plastic members, such as struts 11a, 11b, 11c, 13a, 13b, 14a, 14b, 16a, 16b, 19a and 19b are all straight extruded, hollow, tubular, cylindrical plastic pipes of the same diameter and formed from extruded polyvinyl chloride or some other extruded plastic material and that the various fittings 12a, 12b, 15a, 17, 18a and 19 are also tubular plastic members, being formed of material, such as polyvinyl chloride. These plastic members are shipped in a knocked down form and are assembled into the frame 10, as depicted in FIG. 2, when received by the purchaser. Suitable plastic glue is employed for adhering the various tubular plastic members inserted into the various fittings so as to form an airtight, watertight frame 10.

Figures 3, 4, 5, 6:
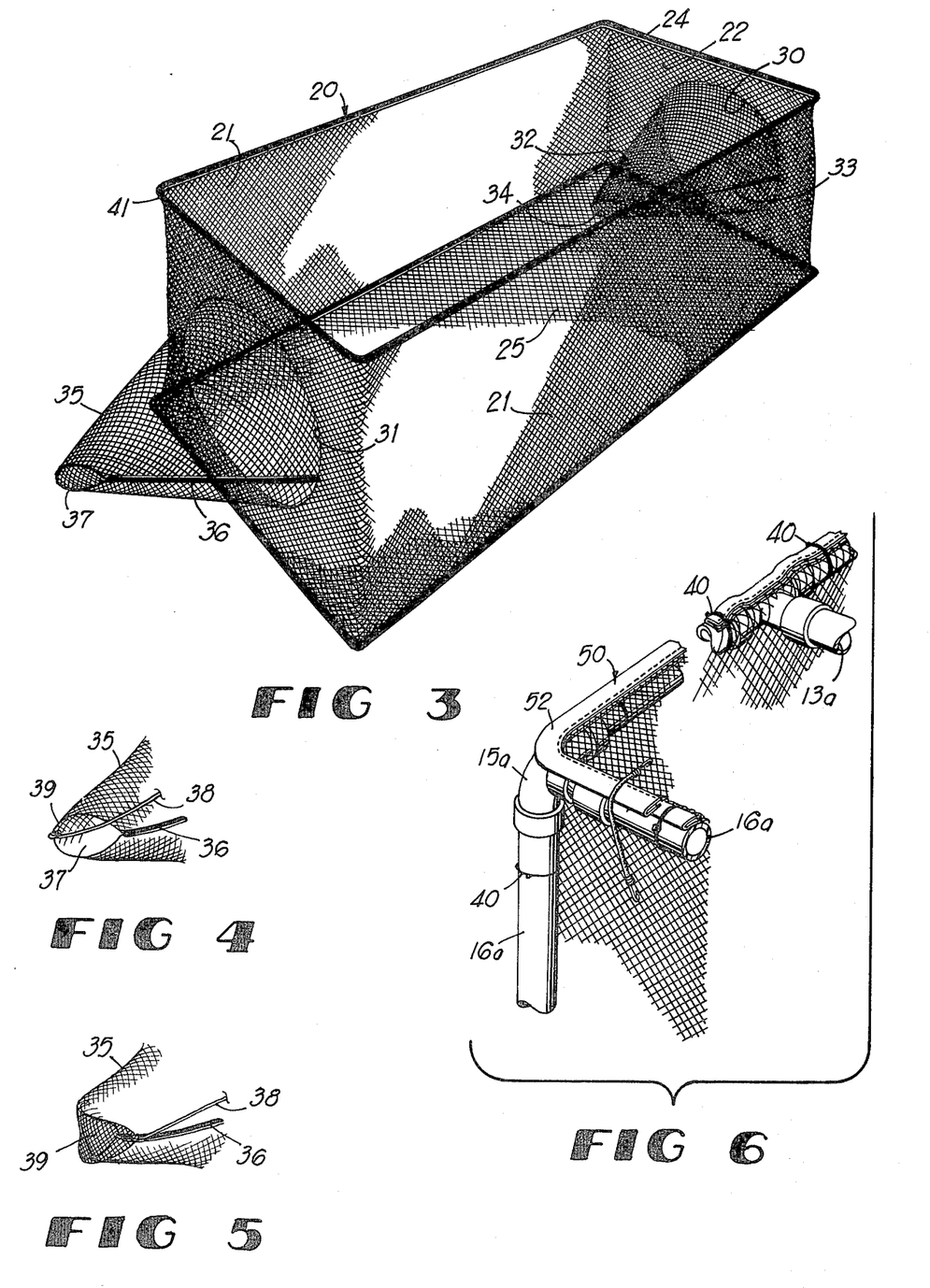
FIG. 3 is a perspective view of the net body of the fish cage depicted in FIG. 1.
FIG. 4 is a perspective view of a detail showing the exit end of the cage depicted in FIG. 1, the exit end being in an opened condition.
FIG. 5 is a view similar to FIG. 4 but showing the exit end in a closed condition.
FIG. 6 is an enlarged fragmentary perspective view of a portion of the cage depicted in FIG. 1.
Figure 7:
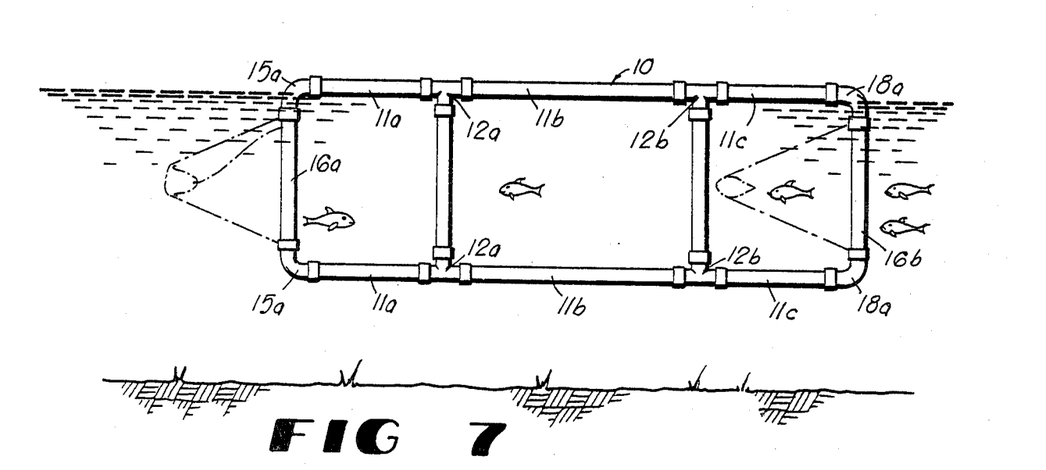
FIG. 7 is a side elevational view of the frame of the cage showing the cage in a floating condition.
Figure 8:
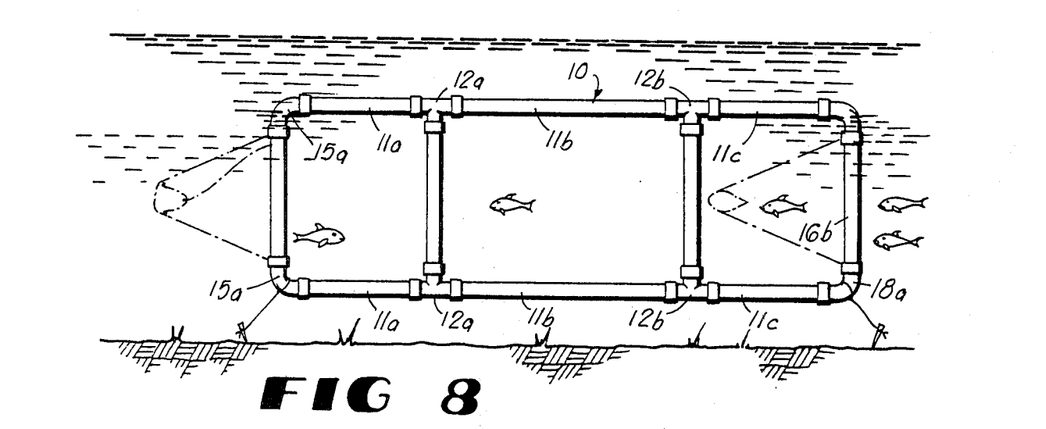
FIG. 8 is a view similar to FIG. 7 but showing the cage in a floating condition but anchored below the surface of the water.
Figure 9:
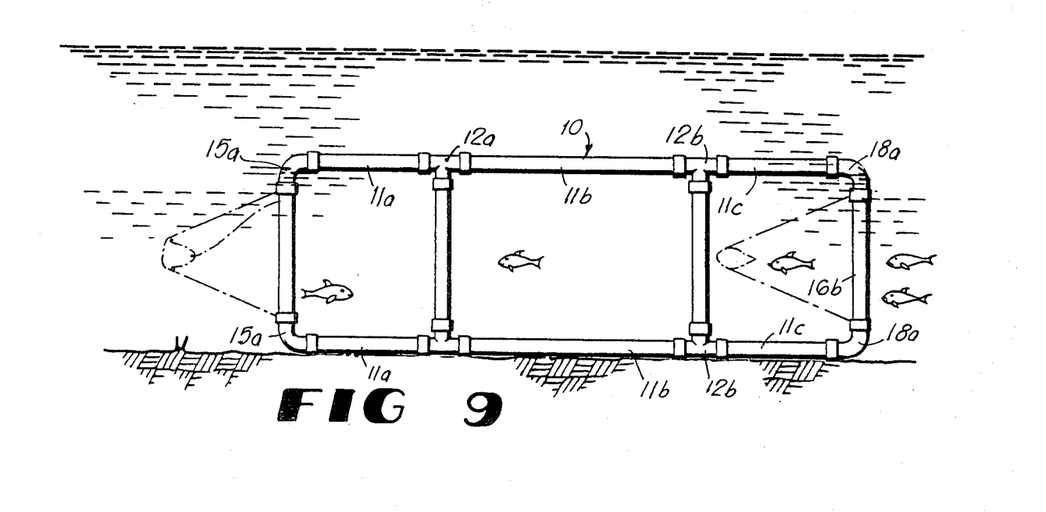
FIG. 9 is a view similar to FIGS. 7 and 8 but showing the cage resting upon the bottom.

Disposed within the frame 10 is a net assembly, denoted generally by the numeral 20. As best seen in FIG. 3, the net assembly includes a net body having a pair of opposed side wall 21 and a pair of opposed end walls 22 which join the ends of sidewalls 21 to form a rectangular perimeter. For convenience, a single length of net can be employed for forming the sides 21 and the ends 22 and 23 so that a single vertical seam 24 between end 22 and one of the sides 21, joins the ends of the net together.

Figures 13, 14, 15:
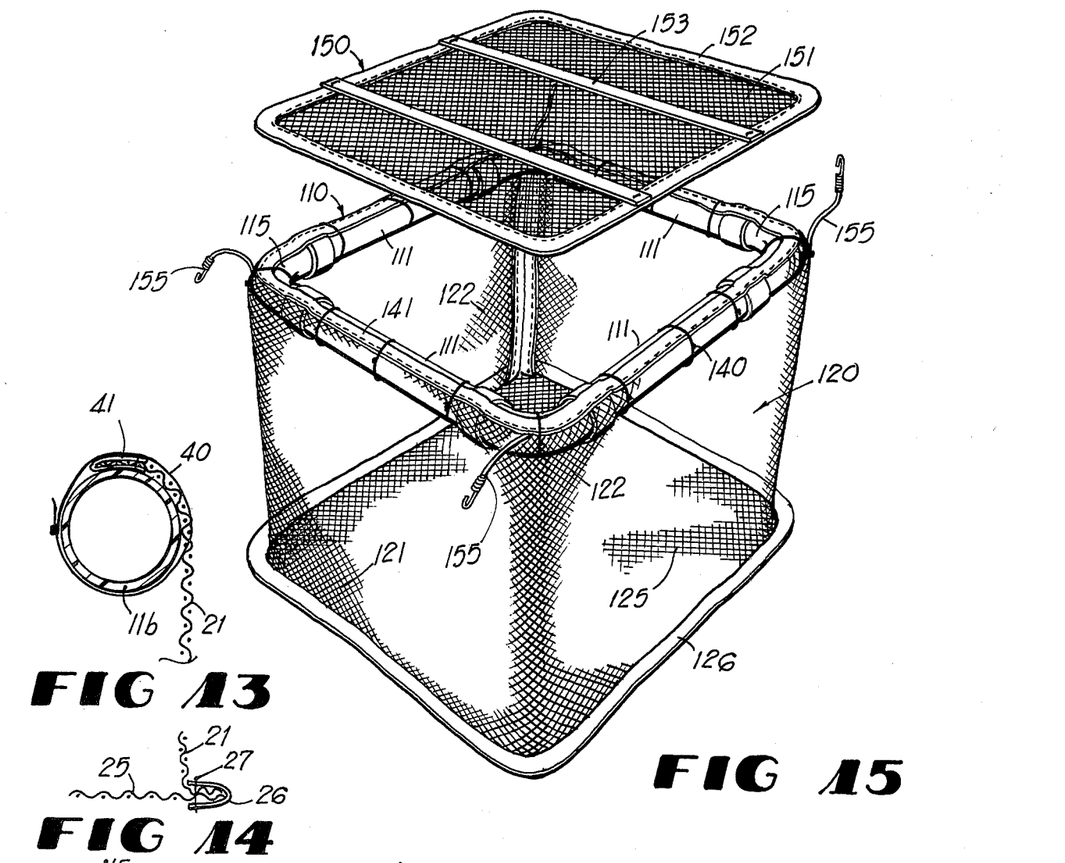
FIG. 13 is an enlarged cross-sectional view of a portion of the cage of FIG. 1, showing a strut to which the upper edge of the net body is attached.
FIG. 14 is an enlarged cross-sectional view of the bottom edge of the net body of the cage shown in FIG. 1.
FIG. 15 is an exploded fragmentary perspective view of a second embodiment of the apparatus for confining fish of the present invention and showing a fish cage constructed in accordance with the present invention.
Figure 16:
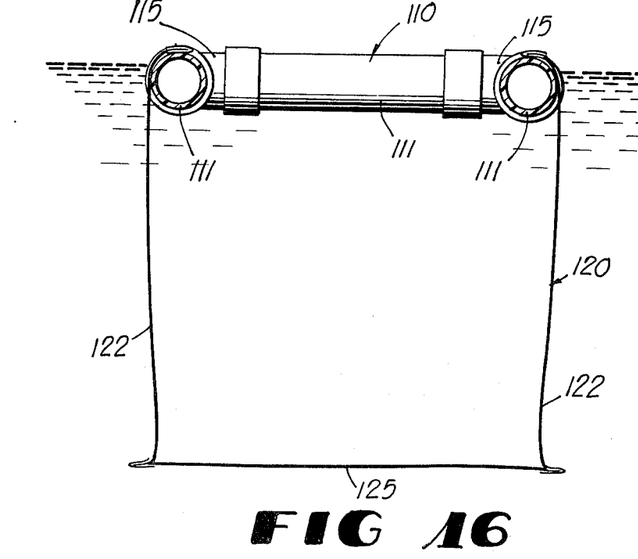
FIG. 16 is a vertical sectional view of a portion of the fish cage shown in FIG. 1.
Figure 17:
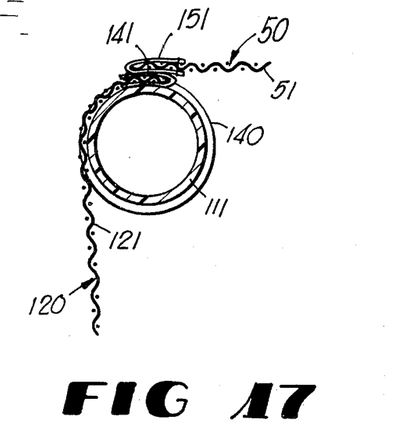
FIG. 17 is an enlarged cross-sectional view of a portion of the fish cage of FIG. 12, showing a strut with the upper perimeter of the net body and the edge portion of the top secured thereto.

A rectangular net bottom 25 is provided along the lower edge of the walls 21 and ends 22 and 23. This net bottom is joined to the lower edge portion of the walls 21 and the ends 22 and 23 as illustrated for wall 21 in FIG. 13. In more detail, the lower edge portion of the wall 21 is turned outwardly so as to be flat against the upper surface of the edge portion of bottom 25 and a U-shaped plastic strip 26 passes over both end portions. Thus, the U-shaped strip sandwiches the end portions of wall 21 and bottom 25 together. Stitching 27, which passes through the two outer portions of the plastic strip 26, also passes through the end portions of walls 21 and bottom 25 so as to join these and portions together as illustrated in FIG. 13.

In like fashion, the seam 24 is formed by the end portions of the side wall 21 and the end wall 22 which are folded outwardly and are flat against each other. A plastic strip, similar to plastic strip 26, extends over the two end portions so as to be outwardly adjacent both the end portion of wall 21 and the end portion of end wall 22 and stitching, such as stitching 27, extends through the plastic strip so as to join the two portions of the plastic strip and the end portions of walls 21 and 22 together.

Figure 11:
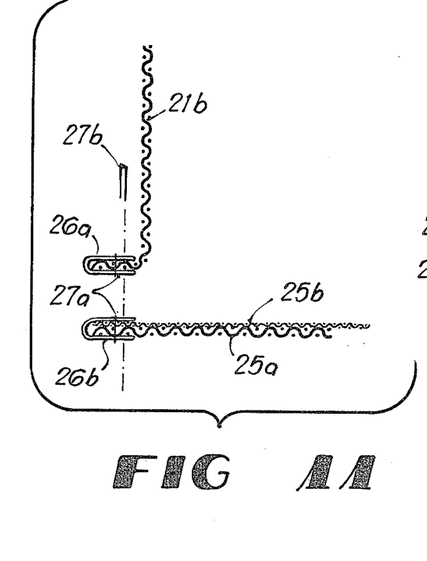
FIG. 11 is an enlarged fragmentary exploded vertical sectional view of the portion of the fish confining device depicted in FIG. 10.
Figure 12:
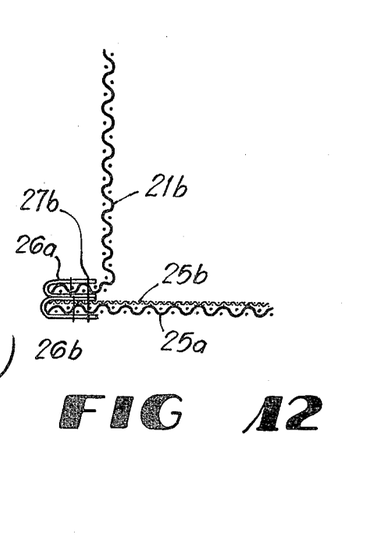
FIG. 12 is a view similar to FIG. 12 but showing the various parts are connected together.

An alternate form of joining the edges of the plastic elements together is illustrated in FIG. 11 and 12. In these drawings, the sidewall 21a is provided with a U-shaped plastic strip 26a around its entire perimeter. In like fashion, the bottom 25a is provided with a U-shaped strip 26b around its perimeter. These borders formed by plastic sheets 26a and 26b are retained in place by stainless steel staples denoted by the numeral 27a.

When the wall 21a is to be joined to the bottom 25a, the lower edge portion of the wall 21a is bent outwardly so that the plastic strip 26a is essentially horizontally disposed and parallel to the U-shaped strip 26b. The two are then brought together and stainless steel staples 27b are employed for securing the same together, the staples passing through the four layers of plastic sheet 26a and 26b.

In the embodiment of FIGS. 11 and 12, the open mesh of bottom 25a is provided with a cover 25b lying along its upper surface, the cover 25b being coextensive with the bottom 25a so that its perimeter protrudes under and is emcompassed by the strip 26b, as illustrated in FIGS. 11 and 12. The staples are 27a for the strip 26b secure the cover 25b in place. Cover 25b is a very fine plastic mesh which forms a feeder bottom on which the feed will rest. The plastic bottom 25b has preferably from about 60 to about 80 holes per square inch. Thus, the feed for the fish will not fall through this cover, but will rest thereon so that the fish can eat the same.

The end walls 22 and 23 are provided with central circular openings 30 and 31, respectively. Each is provided with a yieldable net funnel-shaped member 32 or 33 which will support its own weight by its base portion, the base portion communicating with the opening 30 or 31, as the case may be. The funnel-shaped inlet member 32 for the opening 30 forms a fish inlet through which fish may enter the trap. This cone-shaped or funnel-shaped inlet member is formed by a piece of flexible mesh material is curved to a cone like shape and has a longitudinal seam 33 by which the ends of the material are joined together, the seam being formed essentially as the seam illustrated in FIG. 7. The innermost portion of the fish inlet member 32 is provided with an opening 34 at the apex of the inlet member 32. This inlet opening 34 is generally eliptical being angled with respect to the axis of the fish inlet member 31. This opening 34 forms a fish inlet opening through which all fish pass, upon entering the trap. The inlet opening 34 is located approximately midway between the upper and lower extremeties of the trap and well within the interior thereof. Glue, stitching, or heat welding adheres the base portion of the inlet member 32 to that portion of the end 22 which defines the inlet opening 30.

The fish outlet member 35 is identical to the fish inlet member 32 but converges outwardly, rather than inwardly. It, too, is a funnel-shaped member formed by the mesh material and it has a straight seam 36 which extends longitudinally thereof. The base portion of the fish outlet member 35 is joined by stitching, adhesive, or heat welding to that portion of the end 23 which defines the opening 31. Furthermore, the fish outlet member 35 is provided with an outlet opening 37 at its apex, the opening being exteriorly of opening 31, being generally eliptical and being angularly disposed with respect to the longitudinal axis of the fish outlet member 35. Thus, fish within the cage can readily swim through the outlet member 35 and, thence, through the opening 37 so as to escape from the cage.

As seen in FIGS. 4 and 5, the apex portion of the outlet member 35 has one end of a flexible cable or line 38 connected to it. A similar line (not shown) is provided for inlet member 32. The function of the line 38 is to draw the protruding end portion 39 across the opening 37 so as to prevent the fish from escaping. Thus, an intermediate portion of the line 38 is preferably passed through the mesh material forming the opposite side of outlet member 35 so that the opening and closing of the opening 37 can be controlled from a remote position above the water level by pulling and loosening the line 38.

The body is installed on the frame 10 by means of a plurality of spaced tie wraps 40 known as "zip ties". The tie wraps 40 are plastic members which, when one end is looped through the other, can be progressively tightened and will remain in the tightened position so as to form a closed loop. Each tie wrap 40 is passed around a strut, such as the upper struts 11a, 11b and 11c as well as the upper cross bars 16b and 18b. Additional tie wraps 40 are utilized, if desired, for binding the edges of corners and/or bottom 25 to the adjacent portions of the frame 10.

Preferably the exposed edges of the body 20 such as the upper edge portions of walls 21, 22 and 23 are covered by a reversely bend strip of plastic, such as strip 41, which is looped over the edge portion of the wall 21, 22 or 23 and stitched in place.

Figure 10:
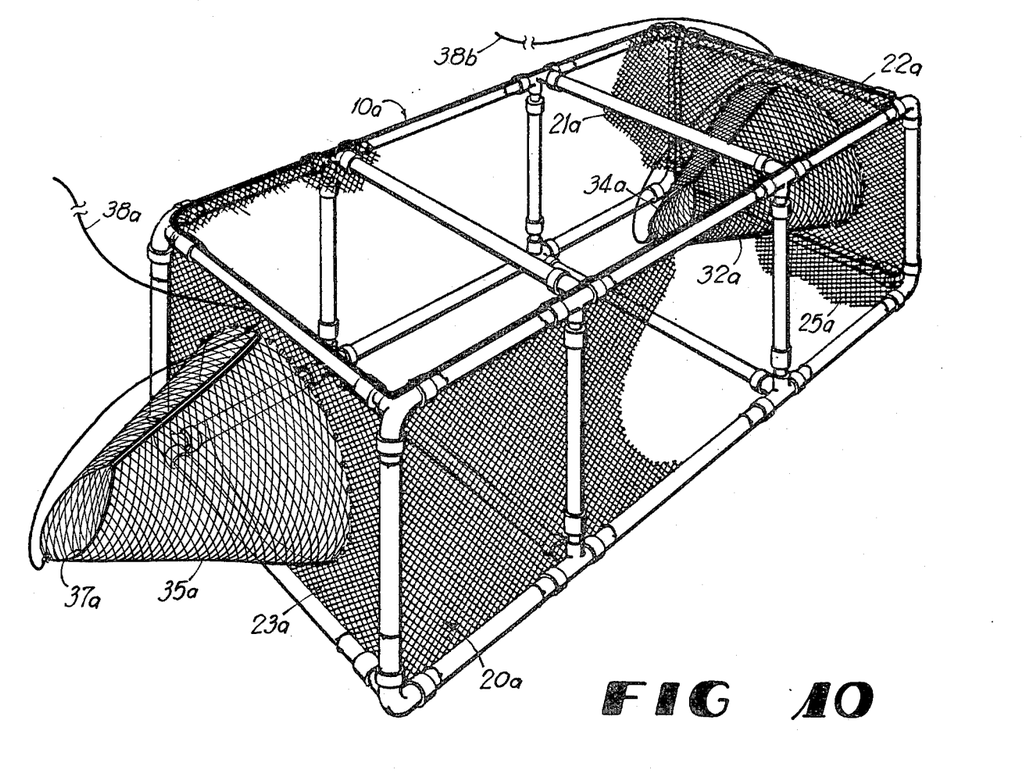
FIG. 10 is a perspective view, partially broken away, showing a modified form of the fish confining device constructed in accordance with the present invention.

An alternate embodiment of the fish cages illustrated in FIG. 10 wherein the frame 10a is identical to the frame 10 and the body 20a is identical to the body 20 except that the funnel-shaped members 32a and 35a are different in that they are respective apex openings 34a and 37a open upwardly and forwardly, rather that to open in a sidewise direction as illustrated in FIG. 3. By such an arrangement, the flexible cables or lines 38a and 38b which are connected respectively to the forward most ends of the members of 32a and 35a are connected to the bottommost portion of the members of 32a and 37a and can then be looped back through the portion of endrail 22a and 23a, immediately above the center line of the respective numbers 32a and 35a. In this way, the cables 38a and 38b, when drawn taut, will collapse the members 32a and 35a in an upward direction, against gravity.

The walls 21, 22, 23 and the bottom 25, as well as the walls 21a, 22a, 23a and the bottom 25a and the funnel-shaped members 32, 35, 32a and 35a are all formed of a flexible yet semi-rigid plastic material having a mesh with oval or eliptical openings in which the major diameter is approximately $\frac{5}{8}$ inches long and the minor diameter is approximately $\frac{1}{2}$ inch long. This enables the water to readily enter and leave the cage. It also permits minnows to escape from the cage but the prevents the larger fish from escaping.

It is now seen that:

The frame 10 forms a protective frame around the net assembly which includes walls 21, 22, 23 and bottom 25 and that the walls 21, 22 and 23 define with the top perimeter of frame 10 an access opening to the net assembly 20.

Figure 1:
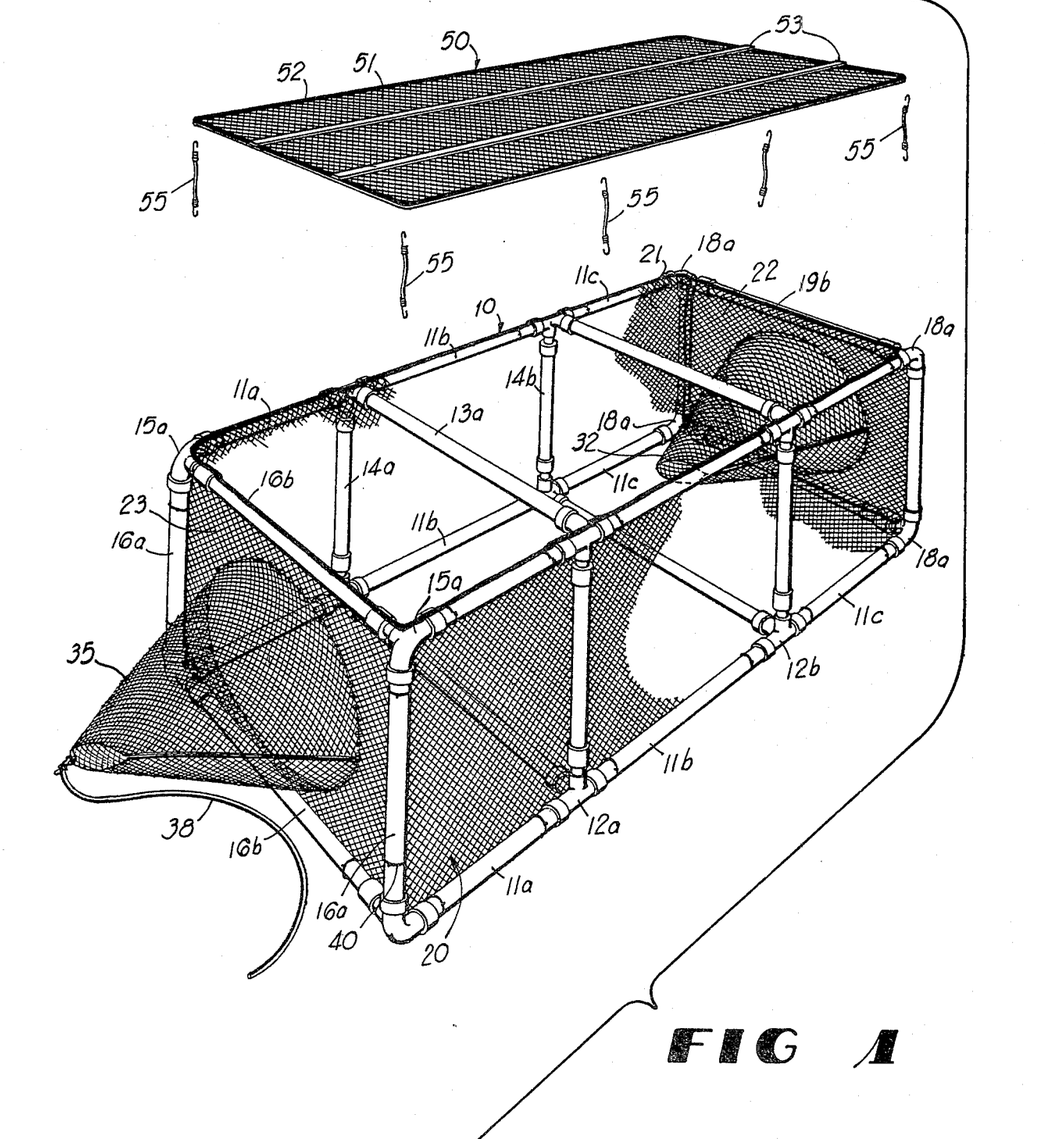
FIG. 1 is a fragmentary exploded perspective view of a fish confining device or cage constructed in accordance with the present invention.

The top, or top wall 50, seen in FIG. 1 is formed of a rectangular sheet of plastic net material, the perimeter of which is covered by a flexible plastic strip 52 in the manner illustrated for covering of the edge portion by strip 41 in FIG. 10. A pair of spaced parallel, longitudinally-extending, straight, aluminum, reinforcing ribs 53 extend along the upper surface of the top 50 so as to extend from the upper strut 16b to the upper strut 19b when the top 50 is installed over the open upper area of the frame 10. When the top is disposed over the upper surface of the frame 10, bungey cords or spring hooks 55 are employed to hook through the netting material as illustrated in FIG. 6 and removable secure the edges, i.e. strip 52, of the top 50 against the top perimeter formed by the upper struts 11a, 11b and 11c and the crossbars or struts 16b and 19b. Of course, such spring loaded hooks 55 can be readily and easily removed when the top is to be released.

In the second embodiment depicted in FIGS. 12, 13 and 14, the fish retaining device or apparatus for retaining fish is in the form of a cage rather than a trap. In this cage is stored fish so that the fish will stay alive. The structure of the cage of FIGS. 11, 12 and 13 include an upper rectangular frame, denoted generally by the numeral 110 which is formed of a plurality of hollow plastic tubular struts 111 which are similar to the tubular struts 11a, 11b and 11c. The ends of the struts 111 are inserted into the elbow fittings 115 so as to provide a closed rectangular member which will float. The body 120 of the cage is formed of a plastic net material similar to the plastic net material forming body 20, the net material being looped to provide a square or rectangle of vertical side walls 121 and vertical end walls 122. A rectangular or square bottom wall 125 is joined to the lower edge portions of the walls 121 and 122 in the same manner as the wall 21 and 25 are joined together as shown in FIG. 10, there being provided a reversely bent flexible plastic strip 126 for that purpose.

The upper edge portion of the walls 121 and 122 are covered by plastic strip 141 in the manner that strip 41 covers the upper edge 21 as illustrated in FIG. 10. The frame 110 fits inside of the upper portion of the body 120 so that the walls 121 and 122 pass outwardly over the outer peripheries of the struts 111 and the strip 141 and terminate on the upper surface of the struts, as illustrated in FIGS. 12, 13 and 14. Tie wraps 140 wrap around the struts 121 and over the plastic strips 140 so as to bind the upper edge portion of the body 120 to the frame 110, as illustrated in FIG. 12.

A top 150 is provided which includes a plastic mesh sheet or wall 151 the perimeter of which is closed by plastic strip 152 while struts 153 extend between opposite sides or ends of this rectangular top 150. The top 150 is of approximately the same dimensions as the frame 110 and, therefore, can be received on the upper periphery of the struts 111, as illustrated in FIG. 14. When so installed, bungey cords or hook members 155 lock the edge portions of the top 150 in place.

When the cage is installed in the water, as illustrated in FIG. 13, the body 120 of the net structure hangs pendant below the floating frame 120. The strip 151 usually lies on top of the strip 141, as illustrated in FIG. 14. When the top 150 is so installed, the fish contained in the cage cannot escape therefrom.

The trap or cage, as the case may be, of the present invention is relatively lightweight and can be made as large as reasonably desired. It will withstand extensive abuse and can be readily repaired when damaged. The fish within the trap or cage, being exposed to the water in which they live, will live for an extended period of time and, indeed, if fed, will live quite comfortably in the trap or cage. The cage or trap can be lifted periodically either manually or by mechanical hooks so as to have access to the fish therein. Water from a sunken cage can also be drained from the cage and the holes in the frame closed so that it will again float.

Figure 18:
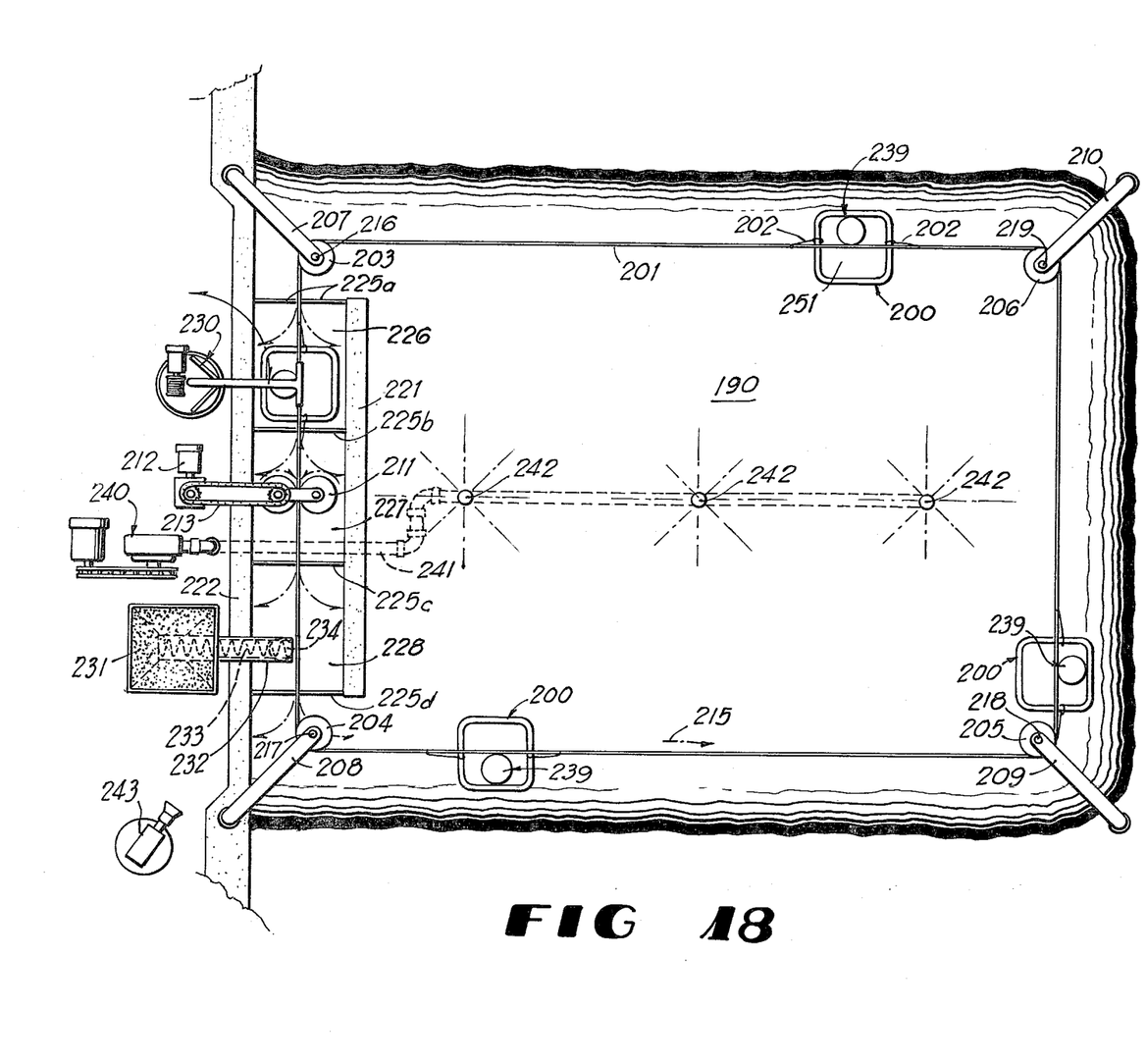
FIG. 18 is a schematic plan showing a pond or other body of water being provided with the apparatus which includes the fish cages of the present invention and the conveyor mechanism and lock mechanism for treating the fish and replenishing their food, constructed in accordance with the present invention.

In the arrangement shown in FIG. 18, it will be seen that a plurality of floating fish cages 200, such as any of those illustrated in the preceding embodiment, are disposed in a pond P and secured to a continuous cable 201 by means of rope or other line 202 which are secured to the cable 201 at spaced locations and to the front and back of each cage 200, so that the longitudinal axis of cage 200 is parallel to the cable 201 as the cable 201 carries the cage around the closed path defined by the cable 201. Preferably from about 50 to about 100 floating fish cages 200 are arranged in succession or tandem along the entire length of the cable 201, the cages 202 being equally spaced from each other. The cable 201 is disposed to form a conveyor having longitudinal and transverse flights in a common horizontal plane spaced close to but above the level of the water, by a plurality of pulleys or sheaves 203, 204, 205 and 206. These pulleys 203, 204, 205, 206 are supported for rotation in a common horizontal plane by stub shafts 216, 217, 218 and 219 which protrude downwardly from a like number of stationary L-shaped booms 207, 208, 209 and 210, respectively. Booms 207, 208, 209 and 210 have their outer ends anchore at the bank of the pond P.

Opposed drive pulleys 211, rotated by a motor 212, are carried by an arm 213 on which the motor 212 is mounted, the arm being conveniently supported from the ground. Abutting peripheral portions of the pulleys 211 form a nip which engages the cable 201 for driving it in the direction of arrow 215 when the motor 212 is energized. This enables the cable 201 to pull all fish cages 200 simultaneously in a closed path beneath cable 201. This closed path includes moving the cages 200 successively through a lock assembly, denoted generally by the numeral 220. This lock assembly 220 includes an outer wall 221 and an inner wall 222, the outer wall 221 being within the water of the pond, lake or pool P. The outer wall 222 forms one end of the bank of the pond P and is disposed parallel to and spaced from the wall 221, as illustrated in FIG. 18.

The lock assembly 220 is provided with successive opposed pairs of gates 225a, 225b, 225c and 225d spaced longitudinally along the lock 220 to define compartments 226, 227 and 228. Ofer the first compartment 226 is disposed the arm of a power winch or boom 230 by means of which each cage 200 can be selectively removed from compartment 226 if it is desired to harvest the fish contained in that cage.

Preferably the spacing between the adjacent cages 200 is greater than the length of the lock 220 so that only a single cage need be handled at a time. Hence, only the outer two doors 225a need be opened when a cage 200 is to be moved into the compartment 226. Also, only the doors 225b need be opened to permit movement of a designated cage 200 to be moved from compartment 226 to compartment 227. In compartment 227, such antibiotics, and pesticides as are desired may be utilized for treating the fish. Thereafter, only doors 225c need be opened to permit movement of the designated cage 200 into the third or feed replenishing compartment 228.

Mounted adjacent the third compartment 228 on wall 222 is a feed hopper 231. This feed hopper 231 is conventional and has a feed tube 232 provided with an auger 233 which, when actuated, will deliver feed progressively from the hopper 231 out of the mouth 234 of the tube 232. Each cage 200 is provided with an automated demand feeder 239 of the type illustrated in FIG. 19. The feed from mouth 234 drops into this feeder 239. The details of the feeder 239, itself, will be described hereinafter.

The bank adjacent lock 220 is also provided with an air pump 240 having a tube 241 for introducing air into the pond P, via a spaced discharge aerator ports 242 in pond P.

The operation of the system can be remotely controlled and monitored by T.V. monitor 243, if desired.

Hence, there appears to be little need for the fish, raised in the pond P to be attended by humans.

Figure 19:
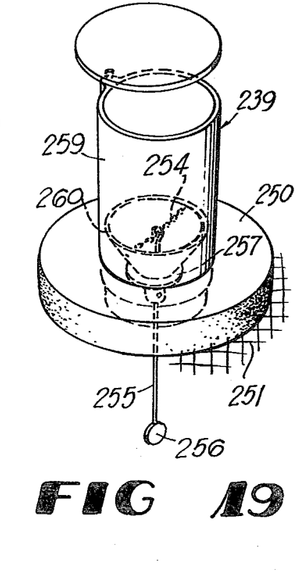
FIG. 19 is a vertical sectional view of a portion of the cage of the preceding embodiments having incorporated therewith an automatic feeder.

Referring now to FIG. 19, it will be seen that the automatic or demand fish feeder 239 which is provided on each of the cages 200 includes an annular mounting ring 251 carried by the top 250 of each cage 200. The feeder 239 also inclues a hollow cylindrical feed hopper or housing 259 which is mounted by its lower end on the ring 250. A suspension chain 254 extending transversely across hopper 251 suspends a pendulum 255 along the vertical axis of the hopper 259. The lower end of the pendulum 255 protrudes below ring 250 and into the water, the lower end of pendulum 255 being provided with a weight or object, such as a mirror 256, against which the fish can move when it desires to be fed.

Figure 20:
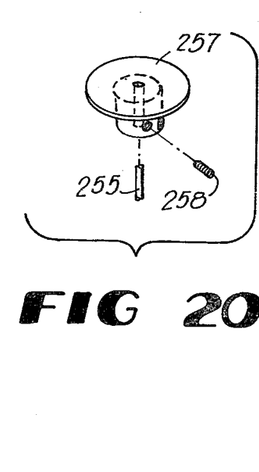

Within the lower portion of the hopper 259, the pendulum 256 carries a flat radially disposed valve member 257, shown best in FIG. 20. The vertical position of valve 257 along the pendulum 255 can be adjusted, as desired, by manipulation of set screw 258. Surrounding the upper end of pendulum 255 is a frusto-conical hopper bottom 260, the open lower end of which is closed by valve 257.

When the pendulum 255 is vertical, valve 257 essentially closes off the opening of bottom 260. Thus, essentially no feed will pass there through. When, however, a fish strikes the weight 256, the pendulum 255 will move the valve 257 sidewise so as to uncover a portion of the bottom opening and permit food to drop therethrough and, thence through the annular member 250 and into the interior of the cage 200.

It is thus seen that very little human effort is required to maintain the fish within the pond P in a fed and healthy condition. Normally the fish will not be confined in a particular cage 200 but are permitted to have free access to and from the cage. When it is desired to harvest the fish, the cages 200 can be closed by pulling on the cable, such as cable 38 or 38a. This will enable the cage 200 to confine the fish so that the cage 200 can be bodily removed with the fish therein.

It will be obvious to those skilled in the art that many variations may be made in the embodiments here chosen for the purpose of illustrating the present invention, without departing from the scope thereof as defined by the appended claims.

I claim:

1. Apparatus for confining fish comprising:
   (a) a bouyant rigid frame defining an essentially open interior, said frame being formed of struts and means joining the ends of such struts, said means and said struts providing a perimeter defining an upper opening;
   (b) a net assembly having flexible side walls and a flexible bottom joining the lower ends of said side walls, the upper edge portions of said side walls extending over and being secured to said frame for defining within said upper opening, an upwardly opening access opening;
   (c) top means forming a removeable top extending over said access opening, said top means being supported by said frame for temporarily closing of said access opening; and
   (d) detent means removeably for securing said top in its position extending over said access opening.

2. The apparatus defined in claim 1 wherein said struts are hollow tubular members and wherein means joining said struts includes fittings receiving the ends of said struts, said fittings permitting communication between the hollow portions of said struts.

3. The apparatus defined in claim 2 wherein said fittings are plastic elbow members.

4. The apparatus defined in claim 2 wherein said struts define a rectangular member which floats with its access opening generally awash.

5. The apparatus defined in claim 1 wherein said struts form spaced first longitudinal struts and spaced first transverse struts and including additional second longitudinal struts disposed blow and in spaced relationship to said spaced first longitudinal struts, additional transversed struts extending between the end portions of said second longitudinal struts, and end struts extending between the end portions of said longitudinal struts, for forming a protective open lattice frame and wherein said net assembly is within the confines of said protective frame formed by the aforesaid struts.

6. The apparatus defined in claim 5 including means connected to said walls for securing said net assembly to said end struts.

7. The apparatus defined in claim 5 wherein all of the aforesaid struts are hollow tubular members and wherein said means for joining the ends of said struts includes hollow fittings, for connecting the adjacent end of said all of the aforesaid struts, the ends of said struts communicating with each other through said hollow fittings for forming an essentially watertight structure.

8. The apparatus defined in claim 7 wherein the ends of all of the aforesaid struts are received in said fittings and including adhesive means for joining said ends of said struts with said fittings.

9. The apparatus defined in claim 1 wherein one of said walls is provided with an opening and including a funnel-shaped inlet member formed of net material, said funnel-shaped inlet member having a relatively large diameter opening at one end and a relatively small diameter opening at the other end, said inlet member being connected by its said one end to that portion of said one of said walls defining said opening.

10. The apparatus defined in claim 9 wherein another of said walls is provided with an opening and including a funnel-shaped outlet member formed of net material, said funnel-shaped outlet member extending outwardly of said net assembly and converging outwardly and having a relatively large diameter opening at one end and a relatively small diameter opening at its other end, said outlet member being connected by its said one end to that portion of said other said walls defining its opening.

11. The apparatus defined in claim 10 wherein said outlet is flexible at its outer end and including a line connected to said outer end for closing its opening at its outer end.

12. The apparatus defined in claim 11 wherein said inlet member tapers inwardly and wherein said outlet member tapers outwardly.

13. The apparatus defined in claim 12 wherein said inlet member and said outlet member are aligned along a common transverse axis.

14. The apparatus defined in claim 1 wherein said top is formed of net and wherein said detent means includes a plurality of bungey cords having hooks at the ends thereof, said cords extending between said wall and said top, said hooks engaging the net of said side walls and the net of said top.

15. The apparatus defined in claim 1 wherein said longitudinal struts include tandem arranged shorter struts and transversely aligned second fittings forming the adjacent ends of said shorter struts, and crossbars extending between said aligned second fittings.

16. A system for raising fish comprising a body of water, a plurality of cages, a cable adjacent to the surface of said water, a plurality of cages partially submerged in the water, said cages being connected in succession to said cable for movement therewith, means for moving said cable to move said cages in said water in said prescribed path in succession and a treatment area, isolatable from the body of water and through which said cages are successively passed when they are moved by said cable.

17. The system defined in claim 16 wherein said cable is a continuous cable and wherein said continuous cable is disposed over said body of water.

18. The system defined in claim 17 including motor means for driving said cable to move said cages simultaneously through the water.

19. A system for raising fish comprising a body of water, a plurality of cages, a cable adjacent to the water, a plurality of cages partially submerged in the water, said cages being connected in succession to said cable, and a treatment area through which said cages successively pass when they are moved by said cable said treatment area including a lock, gates connected to said lock for opening and closing to admit said cages successively into said lock.

20. The system defined in claim 19 wherein said lock includes inner doors for dividing said lock into a plurality of compartments, means associated with one or more said compartments for removing a cage from the water and returning the cage to the water.

21. The system defined in claim 19 including an automatic feed mechanism connected to the top portion of each of said cages and means associated with said lock for supplying food to each of said feed mechanisms when said cage is in said lock.

22. The system defined in claim 16 wherein said cable is a continuous cable and wherein said cages each float with the body portion of each cage submerged in said body of water, means for permitting the ingress and egress of fish to each of said cages, means for closing said means to confine said fish in each of said cages.

23. The system defined in claim 22 wherein said cable is disposed in a common horizontal plane over said body of water, pulleys supporting said cable are for movement in a continous path and motor means for driving said cable.

24. A system for raising fish comprising a body of water, a plurality of cages, a cable adjacent to the water, a plurality of cages partially submerged in the water, said cages being connected in succession to said cable, and a treatment area through which said cages successively pass when they are moved by said cable, said cable being a continuous cable, said cages each being buoyant for floating in said water with the body portion of each cage essentially submerged in said body of water, ingress and egress means for permitting the ingress and egress of fish of each of said cages, means for closing the egress portion of said ingress and egress means to confine said fish in each of said cages, said cable being disposed in a common horizontal plane over said body of water, pulleys supporting said cable for movement in a continuous path, motor means for driving said cable, said treatment area including a lock having a plurality of compartments arranged in juxtaposition, door means for selectively blocking and permitting access from one lock compartment to the next, a hoist associated with one of said locks, a feeder associated with another of said locks for automatically feeding food into each of said cages when that cage is disposed in the compartment with which said feeder is associated.

* * * * *